(12) United States Patent
Modarres et al.

(10) Patent No.: US 9,870,053 B2
(45) Date of Patent: Jan. 16, 2018

(54) SYSTEMS AND METHODS FOR HAPTIC FEEDBACK USING LATERALLY DRIVEN PIEZOELECTRIC ACTUATORS

(75) Inventors: Ali Modarres, Montreal (CA); Li Jiang, Stanford, CA (US); Manuel Cruz, Montreal (CA); Remy Pieron, Portola Valley, CA (US); Frank Ye, Danville, CA (US); Pedro Gregorio, Verdun (CA); Danny Grant, Laval (CA); Neil Olien, Montreal (CA)

(73) Assignee: Immersion Corporation, San Jose, CA (US)

( * ) Notice: Subject to any disclaimer, the term of this patent is extended or adjusted under 35 U.S.C. 154(b) by 199 days.

(21) Appl. No.: 12/701,880

(22) Filed: Feb. 8, 2010

(65) Prior Publication Data
US 2011/0193824 A1  Aug. 11, 2011

(51) Int. Cl.
G06F 3/043 (2006.01)
G06F 3/01 (2006.01)
G06F 3/041 (2006.01)

(52) U.S. Cl.
CPC .............. *G06F 3/016* (2013.01); *G06F 3/041* (2013.01)

(58) Field of Classification Search
CPC ......... G06F 2203/013; G06F 2203/014; G06F 2203/015
USPC ............... 345/177, 178, 173, 156; 340/407.2
See application file for complete search history.

(56) References Cited

U.S. PATENT DOCUMENTS

| 4,912,351 A | 3/1990 | Takata et al. |
| 6,118,435 A | 9/2000 | Fujita et al. |
| 6,429,846 B2 | 8/2002 | Rosenberg et al. |
| 7,408,289 B2 | 8/2008 | Lee |
| 7,800,590 B2 | 9/2010 | Satoh et al. |
| 8,148,876 B2 | 4/2012 | Onishi et al. |
| 8,325,144 B1 | 12/2012 | Tierling et al. |
| 2002/0033795 A1 | 3/2002 | Shahoian et al. |
| 2003/0038776 A1 | 2/2003 | Rosenberg et al. |

(Continued)

FOREIGN PATENT DOCUMENTS

| JP | H02-116758 | 9/1990 |
| JP | H05-302251 | 11/1993 |

(Continued)

OTHER PUBLICATIONS

International Search Report and Written Opinion dated Apr. 26, 2011 for corresponding International Application No. PCT/US2011/023569.

(Continued)

*Primary Examiner* — William Boddie
*Assistant Examiner* — Jeffrey A Parker
(74) *Attorney, Agent, or Firm* — Kilpatrick Townsend & Stockton LLP

(57) ABSTRACT

Systems and methods for haptic feedback using laterally driven piezoelectric actuators are disclosed. For example, one described apparatus for haptic feedback using laterally driven piezoelectric actuators includes: a base; a touch-sensitive interface comprising an interface surface, the touch-sensitive interface affixed to the base and configured to move in a direction lateral to the interface surface; and a piezoelectric actuator mounted to the base and to the touch-sensitive interface and configured to receive a haptic signal and output a force in a direction lateral to the interface surface.

20 Claims, 7 Drawing Sheets

(56) References Cited

U.S. PATENT DOCUMENTS

| | | | |
|---|---|---|---|
| 2005/0174336 A1* | 8/2005 | Nakayama et al. | 345/173 |
| 2006/0007136 A1* | 1/2006 | Nakagome | 345/156 |
| 2006/0022952 A1 | 2/2006 | Ryynanen | |
| 2006/0192657 A1 | 8/2006 | Nishimura et al. | |
| 2007/0035526 A1* | 2/2007 | Takenaka | G06F 3/016 345/173 |
| 2007/0069611 A1* | 3/2007 | Lee | 310/328 |
| 2007/0236450 A1* | 10/2007 | Colgate et al. | 345/156 |
| 2008/0100568 A1 | 5/2008 | Koch et al. | |
| 2008/0297340 A1* | 12/2008 | Popa et al. | 340/539.1 |
| 2009/0051662 A1 | 2/2009 | Klein et al. | |
| 2009/0072662 A1* | 3/2009 | Sadler et al. | 310/319 |
| 2009/0115734 A1 | 5/2009 | Fredriksson et al. | |
| 2009/0160763 A1* | 6/2009 | Cauwels et al. | 345/156 |
| 2010/0231367 A1 | 9/2010 | Cruz-Hernandez et al. | |
| 2011/0025609 A1 | 2/2011 | Modarres | |
| 2011/0095994 A1 | 4/2011 | Birnbaum | |
| 2011/0141052 A1* | 6/2011 | Bernstein | G06F 3/016 345/174 |
| 2011/0304569 A1* | 12/2011 | Kai et al. | 345/173 |

FOREIGN PATENT DOCUMENTS

| | | |
|---|---|---|
| JP | H09266429 | 10/1997 |
| JP | H10-293644 | 11/1998 |
| JP | 2001-015823 | 1/2001 |
| JP | 2001-339965 | 12/2001 |
| JP | 2005152007 | 6/2005 |
| JP | 2006-198473 | 8/2006 |
| JP | 2006-276692 | 10/2006 |
| JP | 2007-007783 | 1/2007 |
| JP | 2007-026344 | 2/2007 |
| JP | 2006-165318 | 8/2008 |
| JP | 2008-287402 | 11/2008 |
| JP | 2009-064357 | 3/2009 |
| JP | 2009-246954 | 10/2009 |
| WO | WO 97/40537 | 10/1997 |
| WO | WO 2003/050754 | 6/2003 |
| WO | WO 2009/088985 | 7/2009 |

OTHER PUBLICATIONS

PCT International Preliminary Report on Patentability dated Aug. 23, 2012 for corresponding International Application No. PCT/US2011/023569.

European Patent Office, Communication pursuant to Article 94(3) EPC, European Application No. 11705334, dated May 13, 2013.

The State Intellectual Property Office of the People's Republic of China, Notification of First Office Action, Application No. 201180008690, dated Aug. 5, 2014.

Japanese Patent Office, Office Action, Application No. 2012-552077, dated Dec. 9, 2014.

The State Intellectual Property Office of the Peoples Republic of China, Notification of the Second Office Action, Application No. 201180008690, dated Mar. 27, 2015.

Korean Patent Office, Notice of Preliminary Rejection, Application No. 10-2012-7020877 dated Apr. 12, 2016.

The State Intellectual Property Office of the Peoples Republic of China, Notification of the Fourth Office Action, Application No. 201180008690 dated Jun. 3, 2016.

European Patent Office, Communication Pursuant to Article 94(3) EPC, Application No. 11705334 dated Jun. 28, 2016.

Luk, J.e t al., A Role for Haptics in Mobile Interaction: Initial Design using a Handheld Tactile Display Prototype, Conference Proceedings/CHI 2006, Conference on Human Factors in Computing Systems: Montreal, Quebec, Canada, Apr. 22-27, 2016, Association for Computing Machinery (ACM) Press, NE, vol. 1, Jan. 2006, pp. 171-180, XP008126551.

Japanese Patent Office, Japanese Office Action, Application No. 2015-195603 dated Oct. 11, 2016.

Japanese Patent Office, Japanese Office Action, Application No. 2015-21155 dated Oct. 11, 2016.

Korean Patent Office, Notice of Preliminary Rejection, Application No. 10-2016-7022620, dated Oct. 31, 2016.

Chinese Patent Application No. 201180008690, Office Action mailed Nov. 3, 2015.

Japan Patent Office Application No. 2015-211555, Office Action dated Jul. 11, 2017, 4 pages.

Korean Patent Office, Notice of Final Rejection, Application No. 10-2012-7020877 dated Jan. 24,2017.

Japanese Patent Application No. 2015-21155, Office Action dated Feb. 21, 2017.

* cited by examiner

SYSTEMS AND METHODS FOR HAPTIC FEEDBACK USING LATERALLY DRIVEN PIEZOELECTRIC ACTUATORS

FIELD OF THE INVENTION

The present invention generally relates to haptic feedback, and more particularly to systems and methods for haptic feedback using laterally driven piezoelectric actuators.

BACKGROUND

Piezoelectric actuators may offer advantages over conventional actuators. However, piezoelectric actuators configured to output normal forces may not provide satisfying haptic feedback to mobile device users. Accordingly, there is a need for systems and methods for haptic feedback using laterally driven piezoelectric actuators.

SUMMARY

Embodiments of the present invention provide systems and methods for haptic feedback using laterally driven piezoelectric actuators. For example, in one embodiment, an apparatus for haptic feedback using laterally driven piezoelectric actuators comprises: a base; a touch-sensitive interface comprising an interface surface, the touch-sensitive interface affixed to the base and configured to move in a direction lateral to the interface surface; and a piezoelectric actuator mounted to the base and to the touch-sensitive interface and configured to receive a haptic signal and output a force in a direction lateral to the interface surface.

This illustrative embodiment is mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention provide systems and methods for haptic feedback using laterally driven piezoelectric actuators.

Illustrative Embodiment of Haptic Feedback Using Laterally Driven Piezoelectric Actuators One illustrative embodiment of the present invention comprises a mobile device such as a mobile phone. In the illustrative embodiment, the mobile device may comprise a device similar to the Samsung Haptic Phone (SCH-W420) equipped with Immersion Corporation's TouchSense® 3000, TouchSense® 4000, or TouchSense® 5000 vibrotactile feedback systems, formerly known as Immersion Corporation's VibeTonz® vibrotactile feedback system. In other embodiments, different messaging devices and haptic feedback systems may be utilized.

The illustrative mobile device comprises a housing, which contains a touch-screen display. The illustrative mobile device also comprises a processor and memory. The processor is in communication with both the memory and the touch-screen display. To provide haptic feedback, the illustrative mobile device also comprises a piezoelectric actuator in communication with the processor. The piezoelectric actuator is configured to receive a haptic signal from the processor and, in response to the haptic signal, output a haptic effect. In the illustrative embodiment, as the user interacts with the mobile device, the processor generates the appropriate haptic signal and transmits the signal to the piezoelectric actuator. The piezoelectric actuator then produces the appropriate haptic effect, which may be output to the user through the touch-screen. In the illustrative device, the piezoelectric actuator produces the haptic effect by applying a force in a plane lateral to the surface touch-screen or display. This force displaces the touch-screen or the display to an extent that the user can feel the displacement, thus causing the user to feel a haptic effect.

This illustrative example is given to introduce the reader to the general subject matter discussed herein. The invention is not limited to this example. The following sections describe various additional embodiments and examples of systems and methods for haptic feedback using laterally driven piezoelectric actuators.

Figure 1:
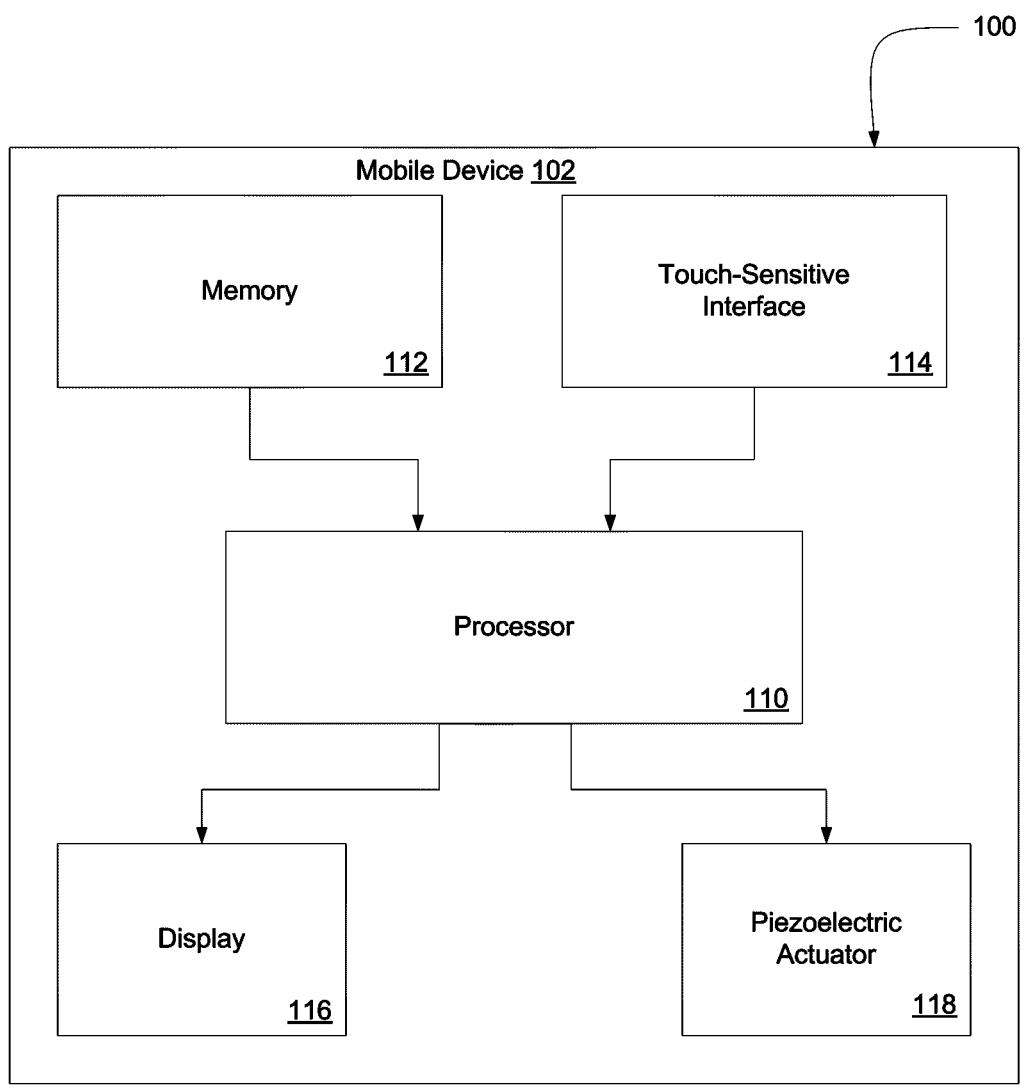
FIG. 1 is a block diagram of a system for haptic feedback using laterally driven piezoelectric actuators according to one embodiment of the present invention.

Illustrative Systems for Haptic Feedback Using Laterally Driven Piezoelectric Actuators Referring now to the drawings in which like numerals indicate like elements throughout the several Figures, FIG. 1 is a block diagram of a system for haptic feedback using laterally driven piezoelectric actuators according to one embodiment of the present invention.

The system 100 shown in FIG. 1 comprises a mobile device 102. In other embodiments, the present invention may be implemented in a variety of handheld devices, such as a mobile phone, a personal digital assistant (PDA), laptop, netbook, tablet computer, or a handheld navigation system. In other embodiments, the present invention may be implemented in devices that are not handheld, for example, in an automobile, personal computer, gaming console, or other electronic device.

Embodiments of the present invention can be implemented in combination with, or may comprise combinations of: digital electronic circuitry, computer hardware, firmware, and software. The mobile device 102 shown in FIG. 1 comprises a processor 110. The processor 110 receives input signals and generates signals for communication, display, and providing haptic feedback. The processor 110 includes or is in communication with one or more computer-readable media, such as memory 112, which may comprise random access memory (RAM).

The processor 110 executes computer-executable program instructions stored in memory 112, such as executing one or more computer programs for messaging or for generating haptic feedback. Processor 110 may comprise a microprocessor, a digital signal processor (DSP), an application-specific integrated circuit (ASIC), one or more field programmable gate arrays (FPGAs), or state machines. The processor may further comprise a programmable electronic device such as a PLC, a programmable interrupt controller (PIC), a programmable logic device (PLD), a programmable read-only memory (PROM), an electronically programmable read-only memory (EPROM or EEPROM), or other similar devices.

Memory 112 comprises a computer-readable media that may store instructions, which, when executed by the processor 110, cause it to perform various steps, such as those described herein. Embodiments of computer-readable media may comprise, but are not limited to, an electronic, optical, magnetic, or other storage or transmission device capable of providing the processor 110 with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor 110, and the processing, described may be in one or more structures and may be dispersed throughout one or more structures.

Referring still to FIG. 1, the mobile device 102 also comprises a touch-sensitive interface 114 in communication with the processor 110. In some embodiments the touch-sensitive interface may comprise a touch-screen. In other embodiments, touch-sensitive interface 114 may comprise an optical sensor or another type of sensor. In one embodiment, touch-sensitive interface may comprise an LED detector. For example, in one embodiment, touch-sensitive interface 114 may comprise an LED finger detector mounted on the side of display 116. In other embodiments, touch-sensitive interface 114 may comprise a button, switch, scroll wheel, roller ball, or some other type of physical device interface known in the art. In some embodiments, the processor is in communication with a single touch-sensitive interface 114, in other embodiments, the processor is in communication with a plurality of touch-sensitive interfaces, for example, a touch-screen and a roller ball. The touch-sensitive interface 114 is configured to detect user interaction, and based on the user interaction, transmit signals to processor 110. One such embodiment comprises a capacitance-based touch-sensitive interface. In other embodiments, touch-sensitive interface 114 may comprise a button, switch, or trackball. In still other embodiments, the mobile device 102 may comprise both a touch-screen and an additional touch-sensitive interface 114.

The mobile device 102 also comprises a display 116. Display 116 is in communication with processor 110 and is configured to display output from the processor 110 to the user. For instance, in one embodiment, the mobile device 102 comprises a liquid crystal display (LCD) disposed beneath the touch-sensitive interface 114. In some embodiments, the display 116 and touch-sensitive interface 114 may comprise a single, integrated component, such as a touch-screen LCD.

The mobile device 102 also comprises a piezoelectric actuator 118, which is in communication with the processor 110 and configured to output a force in a direction lateral to the surface of touch-sensitive interface 114. The processor 110 outputs a haptic signal to the piezoelectric actuator 118, which then outputs a haptic effect based on the haptic signal. For instance, the processor 110 may output a haptic signal designed to cause the piezoelectric actuator to vibrate. In some embodiments, the actuator vibrates between approximately 60 hertz and 300 hertz. In other embodiments, the piezoelectric actuator can be configured to output other types of effects, such as, for example, clicking or popping effects. In one embodiment, the processor 110 generates a haptic signal with a modulating current and/or voltage. This modulation causes the piezoelectric actuator 118 to output a variety of haptic effects. The force output by the piezoelectric actuator 118 may vary depending on the haptic signal output by processor 110. In some embodiments, the force output by piezoelectric actuator 118 may be 300N. In other embodiments, the force may be more or less than 300N.

Many types of piezoelectric actuators may be used to provide lateral forces. For example, in some embodiments, the piezoelectric actuator 118 may comprise a monolithic piezoelectric actuator. In other embodiments, the piezoelectric actuator 118 may comprise a composite piezoelectric actuator. Piezoelectric actuator 118 may be placed in a position where it acts as an elongator, contractor, or bender. The distance that the piezoelectric actuator 118 is displaced when powered may vary depending on configuration. In some embodiments, piezoelectric actuator 118 may be displaced by a distance of 300 Microns. In other embodiments, the piezoelectric actuator 118 may be displaced a distance less than or greater than 300 Microns.

Piezoelectric actuator 118 is configured to output a force in a direction lateral to the surface of display 116. In some embodiments, piezoelectric actuator 118 may be coupled to display 116, and the force may displace display 116 in a plane lateral to the display's surface. In other embodiments, piezoelectric actuator 118 may be coupled to touch-sensitive interface 114. In such an embodiment the force may displace touch-sensitive interface 114 in a direction lateral to the surface of touch-sensitive interface 114. In some embodiments, display 116 may comprise a LCD display, and touch-sensitive interface 114 may comprise a touch-screen. In such an embodiment, piezoelectric actuator 118 may be mounted between display 116 and touch-sensitive interface 114. In such an embodiment, piezoelectric actuator 118 may form a partial or complete seal between display 116 and touch-sensitive interface 114. In such an embodiment, the piezoelectric actuator 118 may further act as a suspension that isolates display 116 or touch-sensitive interface 114, thus amplifying the haptic effect.

In other embodiments, piezoelectric actuator 118 may be attached to display 116 and not to touch-sensitive interface 114. In such an embodiment, piezoelectric actuator 118 may output a force that displaces display 116. This displacement is of a magnitude that is perceptible to the user, and thus causes the user to feel the haptic feedback via display 116.

In other embodiments, piezoelectric actuator 118 may be attached to touch-sensitive interface 114 and not to display 116. In such an embodiment, piezoelectric actuator 118 may output a force that displaces touch-sensitive interface 114. This displacement may be of a magnitude that is perceptible to the user, and thus causes the user to feel the haptic feedback via touch-sensitive interface 114.

Figure 2A:
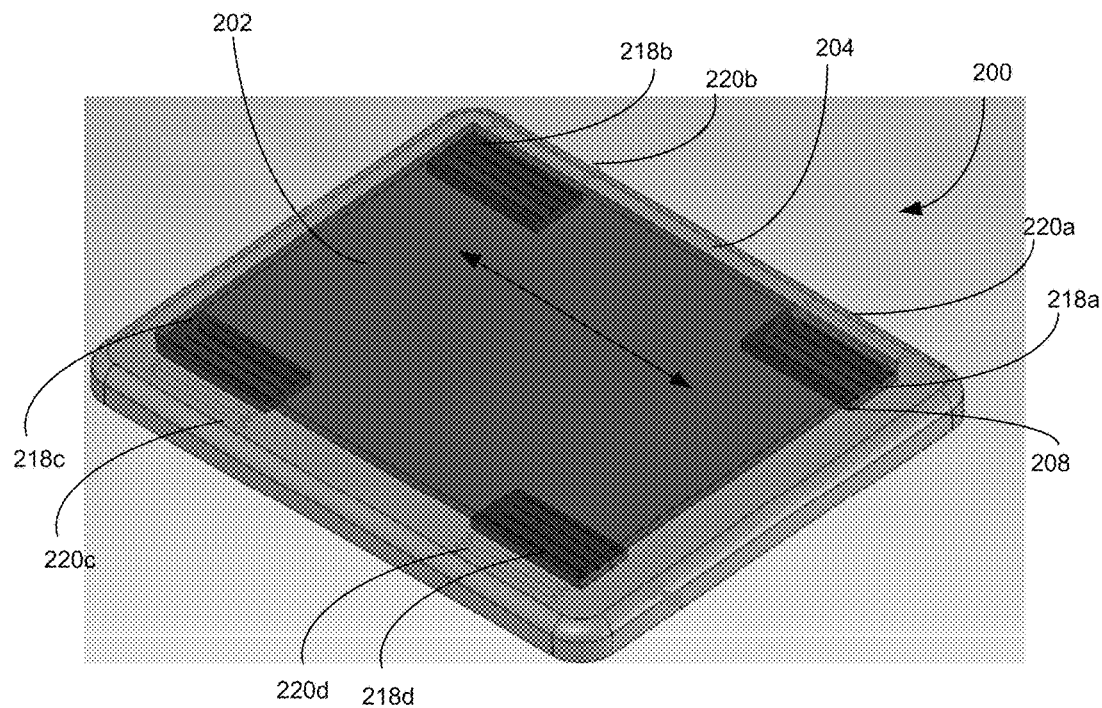
FIG. 2A is a perspective view of an apparatus for haptic feedback using laterally driven piezoelectric actuators according to one embodiment of the present invention.

FIG. 2A is a perspective view of an apparatus for haptic feedback using laterally driven piezoelectric actuators according to one embodiment of the present invention. The apparatus 200 shown in FIG. 2A comprises a plurality of piezoelectric actuators 218. The piezoelectric actuators 218 are mounted to the base 204. The piezoelectric actuators 218 are additionally attached to the touch-sensitive interface 202. For example, in one embodiment, the actuators 218 are mounted to the base 204 using an adhesive mounted at a point 208 on the end of the actuator 218a. In some embodiments, base 204 may comprise a display, such as an LCD display, while touch-sensitive interface 202 may comprise a touch-screen. In some embodiments (not shown in FIG. 2A) the piezoelectric actuators 218 are not mounted to the touch-sensitive interface 202. For example, in such an embodiment, piezoelectric actuators 218 may be mounted to a display and a housing. In such an embodiment, piezoelectric actuators 218 may act as a suspension for the display. In other embodiments, piezoelectric actuators 218 may be mounted to the touch-sensitive interface 202 and not to the display. In such an embodiment, touch-sensitive interface 202 may comprise a touch-pad mounted separately from the display. In such an embodiment, piezoelectric actuators 218 may act as a mount for touch-sensitive interface 204.

In FIG. 2A, as shown by arrows 220, when piezoelectric actuators 218 are activated, they output a horizontal force in a plane lateral to the face of touch-sensitive interface 202. In some embodiments, when piezoelectric actuators 218 are activated they may output a single force lateral to the surface they are mounted on. In other embodiments, piezoelectric actuators 218 may oscillate. In such an embodiment, piezoelectric actuators 218 may output a force in one direction and then back in the other direction. This force causes the actuator to oscillate in a plane lateral to the surface of the display. For example in some embodiments the actuator oscillates at frequencies between 80 Hz and 500 Hz. In other embodiments the actuator may oscillate at a lower or higher frequency. In the embodiment shown in FIG. 2A, the piezoelectric actuators 218 are configured to output a horizontal force in a plane lateral to the surface of the display. In other embodiments, the actuators may be configured to output a force in a different direction but still in the plane lateral to the surface of the display.

Figure 2B:
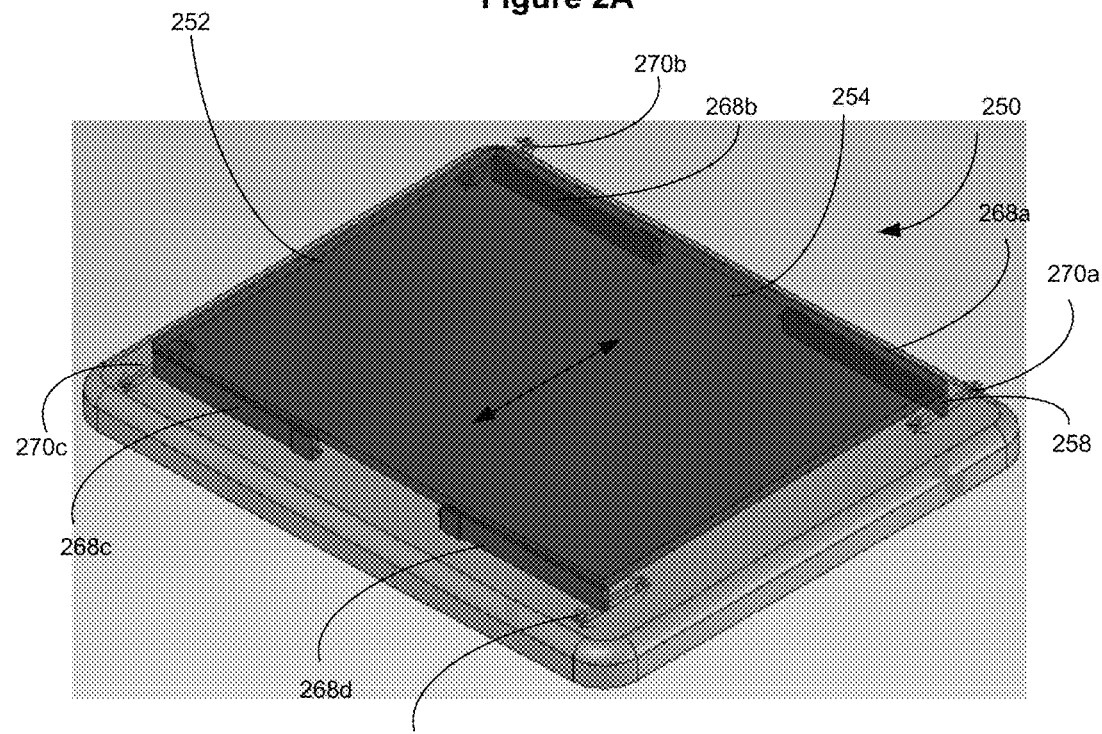
FIG. 2B is a perspective view of an apparatus for haptic feedback using laterally driven piezoelectric actuators according to one embodiment of the present invention.

FIG. 2B is a perspective view of an apparatus for haptic feedback using laterally driven piezoelectric actuators, according to one embodiment of the present invention. The apparatus 250 shown in FIG. 2B comprises a plurality of piezoelectric actuators 268. The piezoelectric actuators 268 are mounted to the base 254. The piezoelectric actuators 268 are additionally attached to the touch-sensitive interface 252. For example, in one embodiment, the actuators 268 are mounted to the base 254 using an adhesive mounted at a point 258 on the end of the actuator 268a. In some embodiments, base 254 may comprise a display such as an LCD display, while touch-sensitive interface 252 may comprise a touch-screen. In some embodiments (not shown in FIG. 2B) the piezoelectric actuators 268 may not be mounted to the touch-sensitive interface 252. For example, in such an embodiment, the piezoelectric actuators may be mounted to the display 116 and a housing. In such an embodiment, piezoelectric actuators 268 may act as a suspension for display 116.

In FIG. 2B, as shown by arrows 270, when piezoelectric actuators 268 are activated, they output a vertical force in a plane lateral to the face of touch-sensitive interface 252. In some embodiments, when piezoelectric actuators 268 are activated, they may output a single force lateral to the surface on which they are mounted. In other embodiments, piezoelectric actuators 268 may oscillate. In such an embodiment, piezoelectric actuators 268 may output a force in one direction and then back in the other direction. In the embodiment shown in FIG. 2B, the piezoelectric actuators 268 are configured to output a vertical force in a direction lateral to the surface of the display, in other embodiments, different configurations are available.

While the piezoelectric actuators 218 and 268 shown in FIGS. 2A and 2B comprise four discreet actuators, in other embodiments, a single piezoelectric actuator may be utilized. In one such embodiment, the single actuator can act as a seal between a touch-sensitive interface and a display.

In embodiments that implement more than one piezoelectric actuator, one actuator may output a pushing force, while a corresponding actuator mounted opposite the first actuator may output a pulling force. Thus, the total force of the combination of piezoelectric actuators is the sum of the force output be each piezoelectric actuator. In embodiments that implement more than one piezoelectric actuator, each piezoelectric actuator may be wired in parallel with the other piezoelectric actuators. In such an embodiment, the total capacitance is equal to the sum of the capacitance associated with each piezoelectric actuator. Thus the processor must account for the additional capacitance of the multiple piezoelectric actuators and output a signal configured to compensate for the additional capacitance associated with multiple piezoelectric actuators.

In some embodiments, not shown in FIG. 2A or 2B, mobile device 200 or 250 may further comprise a layer of material that the display or touch-sensitive interface 202 or 252 glides overtop of. In some embodiments, this material may comprise a foam, in such an embodiment, the foam may comprise foam type BF1000. In other embodiments, the material may comprise a polymer, or some other material known in the art.

Figure 3:
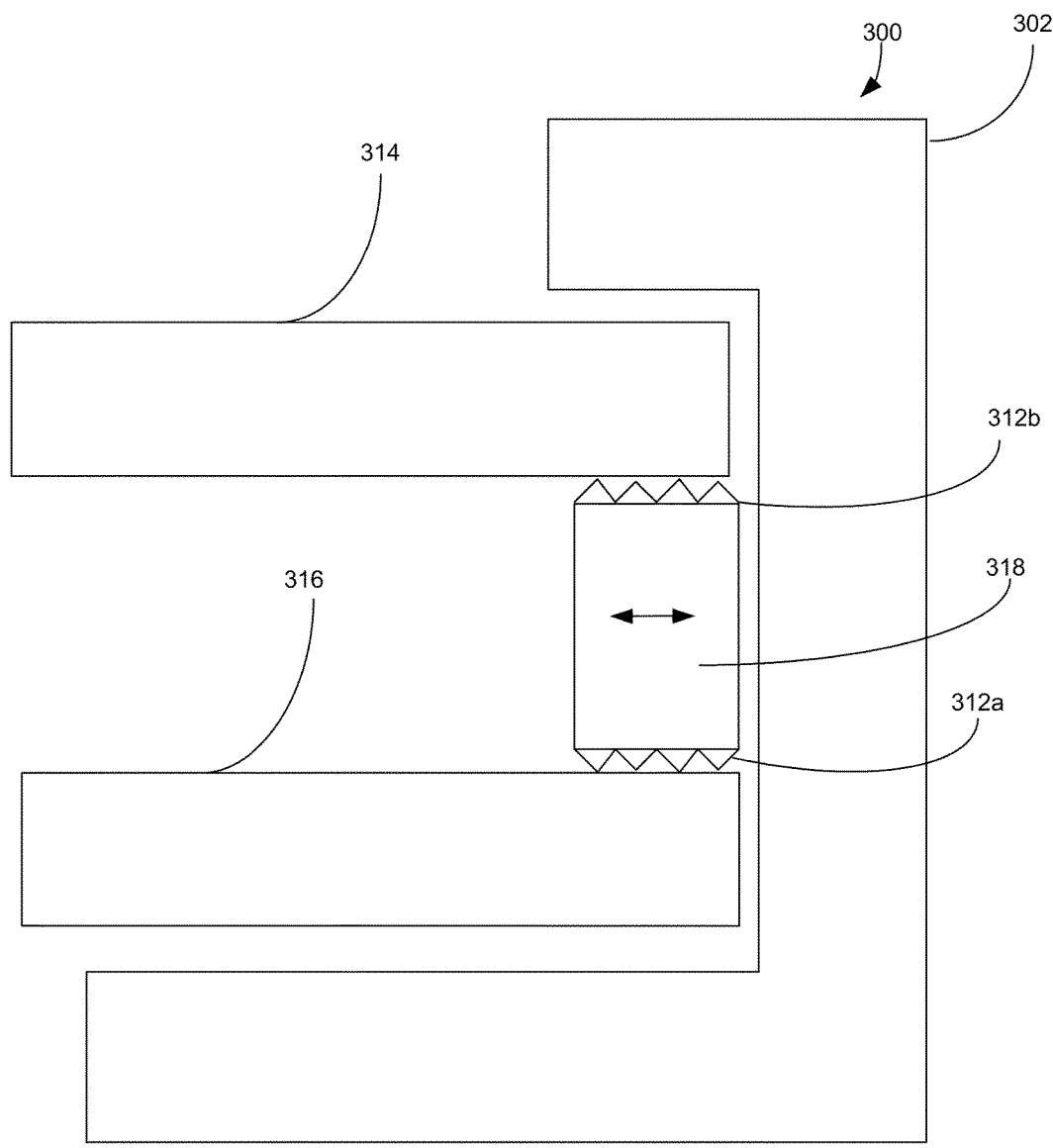
FIG. 3 is a cross section view of a system for haptic feedback using laterally driven piezoelectric actuators according to one embodiment of the present invention.

FIG. 3 is a cross section view of a system for haptic feedback using laterally driven piezoelectric actuators according to one embodiment of the present invention. The embodiment shown in FIG. 3 comprises a device 300. The device 300 comprises a housing 302. The housing 302 contains a touch-sensitive interface 314 as well as a display 316. In the embodiment shown, the touch-sensitive interface 314 is mounted above the display 316. In such a configuration, a seal is necessary to prevent dust and other contaminants from entering the area between touch-sensitive interface 314 and display 316.

The embodiment shown in FIG. 3 also comprises a piezoelectric actuator 318. The piezoelectric actuator 318 is coupled to the display 316, such as to a frame of the display 316, by a layer of adhesive 312a. The piezoelectric actuator 318 is further coupled to touch-sensitive interface 314 by a layer of adhesive 312b. When assembled, actuator 318 and adhesive layer 312 form a seal between touch-sensitive interface 314 and display 316.

In some embodiments, the adhesive layer 312 may be bonded along substantially an entire surface or along multiple surfaces of actuator 318. For example, in one embodiment the adhesive layer may be bonded along a first surface and a second surface opposite the first surface; such an embodiment might be referred to as a "haptic tape." In some embodiments, a haptic tape may comprise a pre-applied adhesive covered by a protective layer, such as paper. When a user installs the haptic tape, the user removes the protective layer and places the haptic tape into position. Thereafter, the haptic tape is held into position by the pre-applied adhesive. In other embodiments, other configurations are available. For example, substantially all surfaces of the actuator may be bonded with an adhesive. In still other embodiments, only one surface of the piezoelectric actuator may be bonded with an adhesive.

In some embodiments, not shown in FIG. 3, the piezoelectric actuator may be embedded in a polymer matrix, for example silicon or epoxy. The addition of the polymer matrix may serve to protect the piezoelectric actuator and, in some embodiments, may help the actuator to form a seal. The addition of a polymer matrix may further enhance the piezoelectric actuator's displacement capabilities.

Figure 4A:
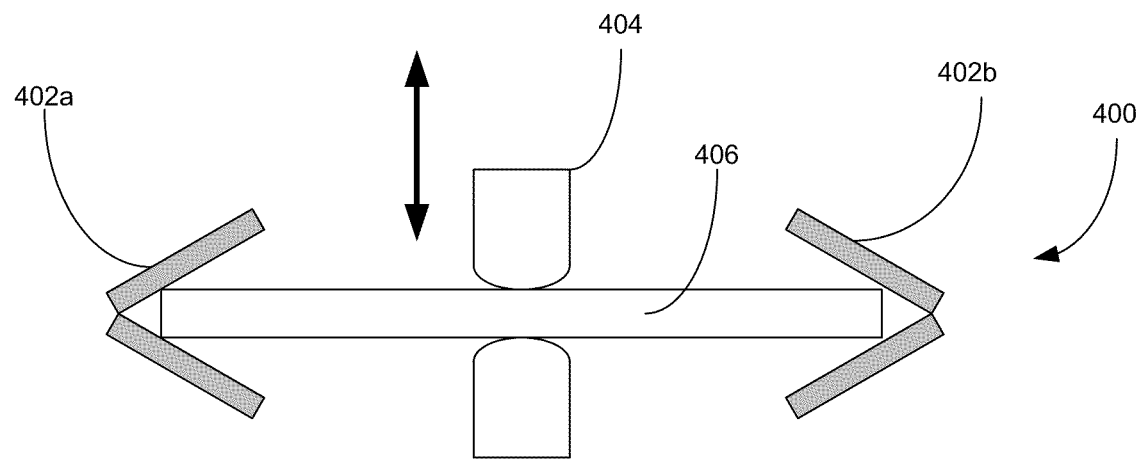
FIG. 4A is perspective view of a system for haptic feedback using laterally driven piezoelectric actuators according to one embodiment of the present invention.

FIG. 4A is perspective view of a system for haptic feedback using laterally-driven piezoelectric actuators according to one embodiment of the present invention. The embodiment in FIG. 4A shows a system 400 for mounting a laterally driven piezoelectric actuator. As shown in FIG. 4A, the system 400 comprises two v-shaped clamps, 402a and 402b, a mount 404, and a piezoelectric actuator 406. Not shown in FIG. 4A is a messaging device housing mounted to the bottom of either v-shaped clamps 402a and 402b or mount 404. Also not shown in FIG. 4A is a display mounted to the top of either v-shaped clamps 402a and 402b or mount 404. In some embodiments, the display may further comprise a touch-sensitive interface, such as a touch-screen.

In the embodiment shown in FIG. 4A, piezoelectric actuator 406 comprises a piezoelectric bender, for example a composite piezoelectric actuator or a monolithic piezoelectric actuator. Piezoelectric actuator 406 is held in place by two v-shaped clamps 402a and 402b and mount 404. Piezoelectric actuator 406 is configured to flex in the direction indicated by the arrow in FIG. 4A. In some embodiments, a display is mounted overtop of mount 404 and v-shaped clamps 402a and 402b. In such an embodiment, the display may be affixed to the top of mount 404, and the bottom of v-shaped clamps 402a and 402b will be affixed to a messaging device housing. When the processor transmits a haptic signal to piezoelectric actuator 406 it will oscillate forward and backward. When the actuator oscillates, its ends are held rigid by v-shaped clamps 402a and 402b, and its center moves. This movement displaces the display forward and backward in relation to the messaging device housing. In another embodiment, the mounts may be different, for example, the top of v-shaped clamps 402a and 402b may be mounted to the display, and the bottom of mount 404 may be mounted to the messaging device housing.

In some embodiments, mount 404 and v-shaped clamps 402a and 402b may comprise mounts made of a stiff rubber, plastic, or metal. In other embodiments, mount 404 and v-shaped clamps 402a and 402b may comprise some other substance known in the art. In some embodiments, mount 404 and v-shaped clamps 402a and 402b may further comprise a bushing comprised of stiff rubber or some other substance known in the art. This bushing may serve to form a more firm mount between the piezoelectric actuator and v-shaped clamps 402a and 402b and mount 404. In some embodiments, v-shaped clamps 402a and 402b may take a different shape, for example the shape of a U or an L. In some embodiments, mount 404 may comprise a clamp.

In some embodiments, multiple mountings 400 may be affixed to the display and messaging device housing. For example, two mountings 400 may be placed on opposite sides of a the display of a messaging device. In another embodiment, four of the mountings 400 may be used, for example one placed in each corner of a rectangular display. In other embodiments, different numbers of mountings 400 may be used. For example, in one embodiment, only one of the mountings 400 shown in FIG. 4A may be required to output the appropriate haptic effect. In such an embodiment, the mounting 400 may be positioned so that it is aligned with the center of mass of the display. For example, the mounting 400 may be positioned such that it is at or near the center of mass of the display. In other embodiments, the mounting 400 may be placed at a different location according to the need to move the display with respect to the messaging device housing.

Figure 4B:
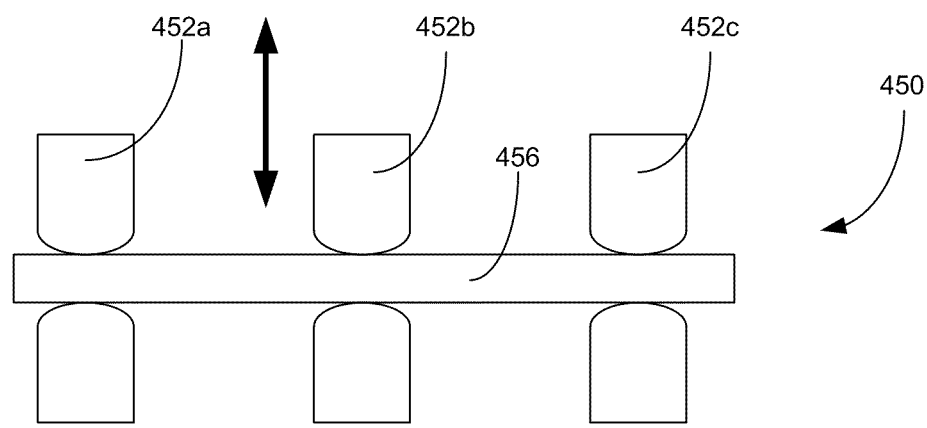
FIG. 4B is perspective view of a system for haptic feedback using laterally driven piezoelectric actuators according to one embodiment of the present invention.

FIG. 4B is perspective view of a system for haptic feedback using laterally-driven piezoelectric actuators according to one embodiment of the present invention. FIG. 4A comprises a view of a system 450 for mounting a lateral drive piezoelectric actuator according to one embodiment of the present invention. As shown in FIG. 4B, the system 450 comprises three mounts 452a, 452b, and 452c, and a laterally driven piezoelectric actuator 456. Not shown in FIG. 4B is a messaging device housing mounted along the bottom of two of the three mounts 452a, 452b, and 452c. Also not shown in FIG. 4B is a display mounted to the top of one of the three mounts 452a, 452b, and 452c. In some embodiments, the display may further comprise a touch-sensitive interface, such as a touch-screen.

In the embodiment shown in FIG. 4B, piezoelectric actuator 456 comprises a piezoelectric bender, for example, a composite piezoelectric actuator or a monolithic piezoelectric actuator. Piezoelectric actuator 456 is held in place by mounts 452a, 452b, and 452c. Piezoelectric actuator 456 is configured to flex in the direction indicated by the arrow in FIG. 4B. In some embodiments, a display is mounted overtop of mounts 452a, 452b, and 452c. In such an embodiment, the display may be affixed to the top of one of the mounts, and the bottom of the other two mounts may be affixed to a messaging device housing. For example, in one embodiment, a display is affixed to the top of mount 452c. In such an embodiment, the bottom of the two remaining mounts, 452a and 452b is mounted to a messaging device housing. In such an embodiment, when the processor transmits a haptic signal to piezoelectric actuator 456, it oscillates forward and backward. In one embodiment, this movement is held fixed by mounts 452a and 452b, but mount 452c, which is mounted to the display, is allowed to move. Thus, the actuator moves the display forward and backward with respect to the messaging device housing. In another embodiment, the mountings may be different. For example, mounts 452a and 452c may be mounted to the messaging device housing and mount 452b may be mounted to the display. In still other embodiments, mount 452a may be mounted to the messaging device housing, and mounts 452b and 452c may be mounted to the display.

In some embodiments, mounts 452a, 452b, and 452c may comprise mounts made of a stiff rubber, plastic, or metal. In other embodiments, mounts 452a, 452b, and 452c may comprise some other substance known in the art. In some embodiments, mounts 452a, 452b, and 452c may further comprise a bushing comprised of stiff rubber or some other substance known in the art. This bushing may serve to form a more firm mount between the piezoelectric actuator and mounts 452a, 452b, and 452c. In some embodiment, mounts 452a, 452b, and 452c may comprise clamps configured to grip piezoelectric actuator 456.

In some embodiments, multiple mountings 450 may be affixed to a display and messaging device housing. For example, two mountings 450 may be placed on opposite sides of a the display of a messaging device. In another embodiment, four of the mountings 450 may be used, for example one placed in each corner of a rectangular display. In other embodiments, different numbers of mountings 450 may be used. For example, in one embodiment, only one of the mountings 450 shown in FIG. 4A may be required to output the appropriate haptic effect. In such an embodiment, the mounting 450 may be positioned so that it is aligned with the center of mass of the display. For example, the mounting 450 may be positioned such that it is at or near the center of mass of the display. In other embodiments, the mounting 450 may be placed at a different location, according to the need to move the display.

Mountings of the type shown in FIGS. 4A and 4B avoid the need for rigid connections to the piezoelectric actuator. This reduces the required tolerance in the manufacturing and assembly process and also makes replacement of the piezoelectric material easier. Further, use of the mountings shown in FIGS. 4A and 4B may reduce unwanted vibrations, particularly when used in combination with bushings that may act as dampeners. Additionally, as shown in FIG. 4A, v-shaped clamps 402a and 402b serve to hold the ends of the actuator and to define a limit to the extent that piezoelectric actuator 406 can bend. This may serve to increase the operating life of the piezoelectric material. Finally, mounting systems such as those shown in FIGS. 4A and 4B may serve as flexible mounts for the display, thus incorporating additional shock protection if the messaging device is dropped.

Figure 5:
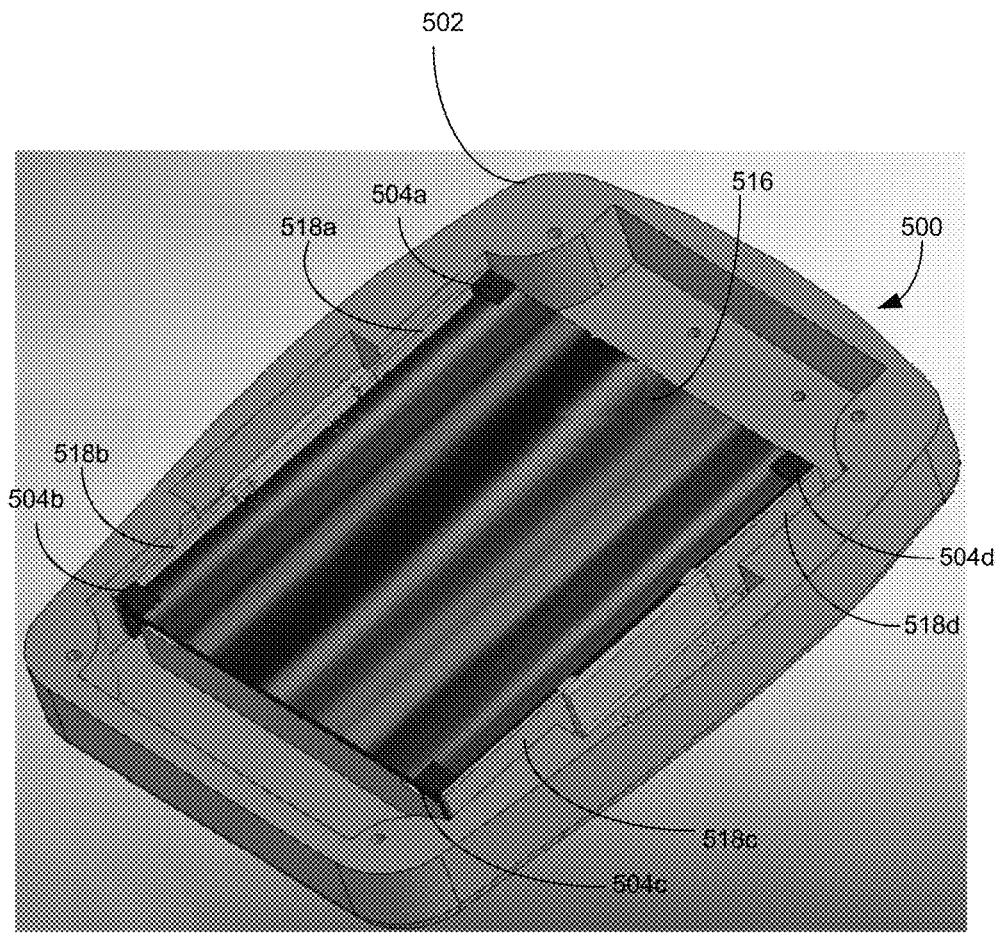
FIG. 5 is a perspective view of a system for haptic feedback using laterally driven piezoelectric actuators according to one embodiment of the present invention.

FIG. 5 is a perspective view of a system for haptic feedback using laterally driven piezoelectric actuators according to one embodiment of the present invention. FIG. 5 shows a cutaway view of mobile device 500. The mobile device 500 comprises a housing 502. A display 516 is mounted within the housing. In some embodiments, display 516 may further comprise a touch-sensitive interface, for example, a touch-screen.

In the embodiment shown in FIG. 5, piezoelectric actuators 518 are used to mount display 516 to housing 502. In some embodiments, piezoelectric actuators 518 may comprise monolithic piezoelectric actuators. In other embodiments, piezoelectric actuators 518 may comprise composite piezoelectric actuators. In some embodiments, piezoelectric actuators 518 may further comprise piezo benders or piezo elongators. Mounting features 504 also hold display 516 in place. These mounting features may comprise clips which hold display 516 in housing 502. In some embodiments, not shown in FIG. 5, mobile device 500 may further comprise a layer of material that display 516 glides overtop of. In some embodiments, this material may comprise a foam. In such an embodiment, the foam comprise foam type BF1000. In other embodiments, this material may comprise a polymer, or some other material known in the art.

Figure 6:
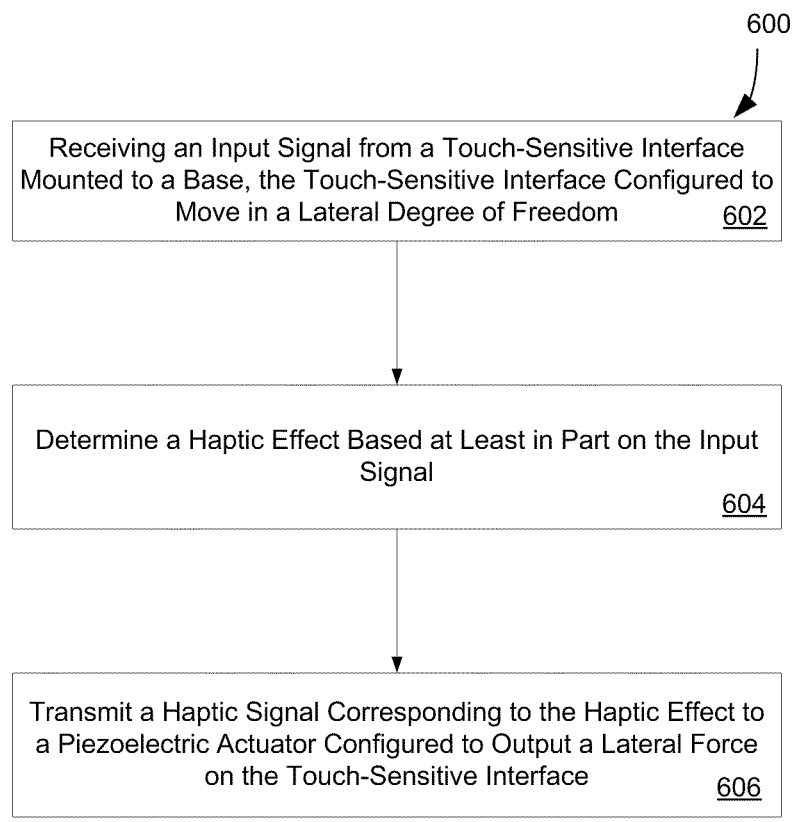
FIG. 6 is a flow diagram of a method for generating haptic feedback using laterally driven piezoelectric actuators according to one embodiment of the present invention.

Illustrated Method for Haptic Feedback Using Laterally Driven Piezoelectric Actuators Haptic feedback using laterally driven piezo actuators may be output in a variety of ways. FIG. 6 is a flow diagram of a method for generating haptic feedback using laterally driven piezoelectric actuators according to one embodiment of the present invention, which is discussed with respect to the device shown in FIG. 1.

In the embodiment shown, the process 600 begins when processor 110 receives an input signal from a touch-sensitive interface mounted to a base, the touch-sensitive interface configured to move in a lateral degree of freedom 602. In some embodiments, touch-sensitive interface 116 comprises a touch-screen. In other embodiments, touch-sensitive interface 116 comprises a button or a touch-pad. In some embodiments, the base comprises display 116. In such an embodiment, display 116 may comprise an LCD display. In other embodiments, the base may comprise a housing, for example a mobile device housing.

Next, processor 110 determines a haptic effect based at least in part on the input signal 604. In some embodiments, determining a haptic effect comprises, determining the intensity of force to output, and determining the length of time to output the force. In some embodiments, processor 110 may determine a force which corresponds to a user interaction detected by the touch-sensitive interface. For example, if touch-sensitive interface 114 detects a gentle user interaction, processor 110 may determine a weak force. In contrast, if the touch-sensitive interface 114 detects a hard or fast user interaction, the processor 110 may determine a hard or fast force. In some embodiments the processor 110 may determine the force using a set of algorithms defined by program code. In other embodiments, the processor 110 may determine the force to output by accessing a lookup table stored in memory local to the processor 110 or on memory 112.

Then, processor 110 transmits a haptic signal to a piezoelectric actuator 118 configured to output a force in a direction lateral to the display surface 606. The piezoelectric actuator 118 is mounted in a position such that, when activated, it applies a force in a direction lateral to the surface of display 116. In some embodiments the haptic signal is an oscillating signal. For example, in some embodiments, the haptic signal may oscillate at a frequency between 80 Hz and 500 Hz. In other embodiments, the haptic signal may be of a lower or higher frequency. After receiving the haptic signal, piezoelectric actuator 118 outputs the force in a plane that is lateral to the surface of the display. In some embodiments, piezoelectric actuator 118 is mounted such that when the force is output, it displaces the touch-sensitive interface 114 or the display 116. In such an embodiment, the user may detect the displacement. Thus, the force is output to the user as a haptic effect.

Figure 7:
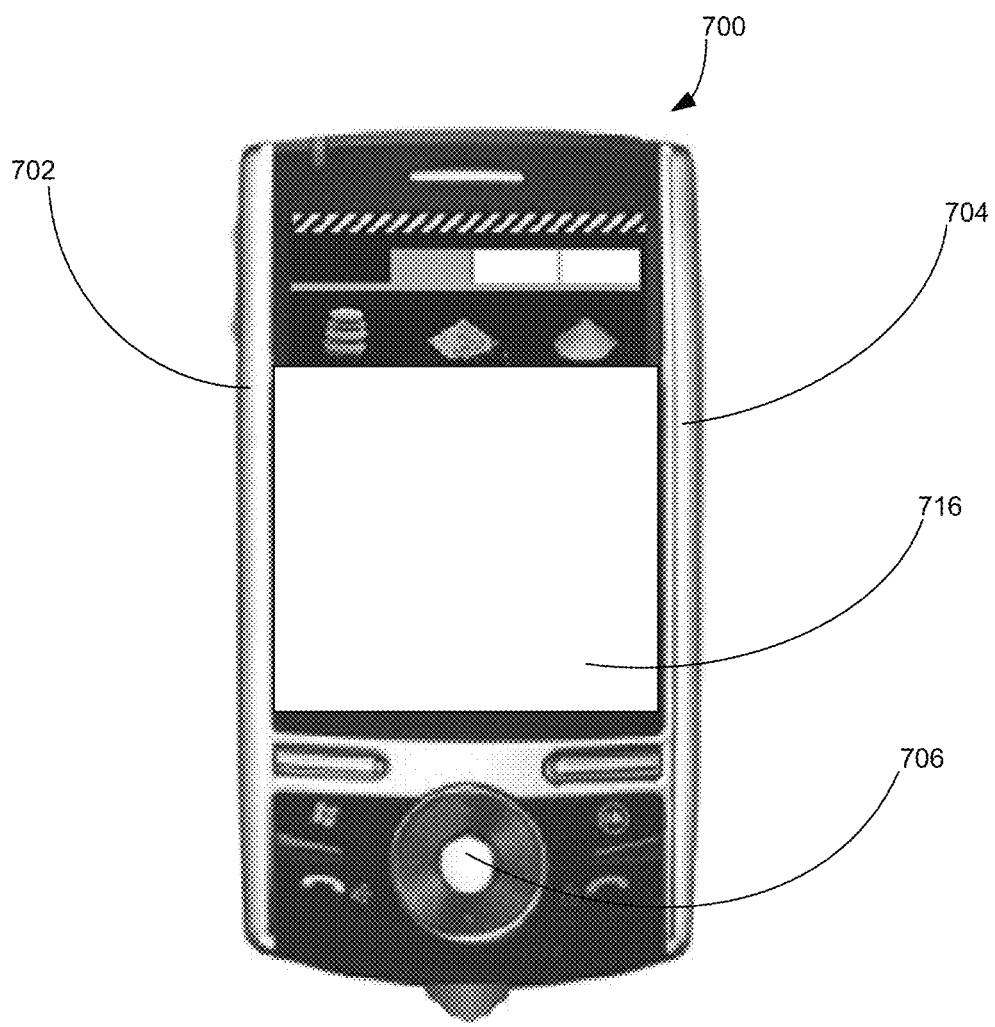
FIG. 7 is an illustration of a device which implements haptic feedback using laterally driven piezoelectric actuators according to one embodiment of the present invention.

Illustrative Application of Haptic Feedback Using Laterally Driven Piezoelectric Actuators A variety of devices may make use of embodiments of the present invention to provide compelling haptic feedback to users of those devices. FIG. 7 is an illustration of a device which implements haptic feedback using laterally driven piezoelectric actuators according to one embodiment of the present invention.

The device 700 shown in FIG. 7 is a mobile phone. The mobile phone 700 comprises a housing 702. The housing 702 contains the various components of the mobile phone, such as a processor, memory, communication interfaces, battery, and other elements.

The mobile phone also comprises a display 716. In the embodiment shown, display 716 further comprises a touch-screen 704. The touch-screen overlays the display 716, which in the embodiment shown comprises an LCD display.

In one embodiment, a piezoelectric actuator is mounted between the touch-screen 704 and the LCD display to provide haptic feedback to a user of the mobile phone 700. The piezoelectric actuator is mounted in a position such that, when activated, it applies a force in plane lateral to the surface of the display 716. This force displaces the surface of the touch-screen 704 or the display 716. The user feels this displacement, thus the user feels a haptic effect.

The mobile phone 700 further comprises a touch pad 706. The touch pad 706 provides a second means of input to the mobile phone 700. The processor may use input from both the touch-screen 704 and the touch pad 706 to determine the type of haptic effect to output. In one embodiment, the piezoelectric actuator is mounted between the touch pad 706 and the housing 702. In such an embodiment, the piezoelectric actuator applies a force to the touch pad 706 in a plane lateral to the surface of display 716. In such an embodiment, the force displaces the touch pad to an extent that the user feels the displacement. This causes the user to feel a haptic effect.

Advantages of Various Embodiments of the Present Invention

Embodiments of the present invention provide numerous advantages over conventional methods of providing haptic feedback, including conventional methods of utilizing piezoelectric actuators. Piezoelectric actuators are capable of producing a wide range of frequencies, allowing them to support various haptic applications. Conventional implementations may use piezoelectric actuators to apply a force normal to the surface of the display of the mobile device. This force pushes the display out toward the user. While the user may feel this haptic effect, the display flexes, possibly causing damage. Further, when the display flexes, its range of motion is reduced, thus the user feels a less powerful haptic effect.

Displays are more rigid in the horizontal plane than in the vertical plane; thus, a force applied in the lateral direction is less likely to bend the display than a force applied in the normal direction. Consequently, the embodiments of the present invention reduce the likelihood that the display will bend and provides a more consistent haptic effect. Further, lateral actuation reduces the effects that pressure from the user's finger has on the haptic effect. The more robust design of embodiments of the present invention can serve to increase operating life. Additionally, lateral actuation can be implemented with a single actuator, thus reducing cost over systems using normal actuation, which requires at least two actuators and possibly many more.

Furthermore, when a piezoelectric actuator is used to provide a lateral force, the overall packaging of the piezoelectric actuator can remain relatively thin, so that it may be placed between a touch-screen and a display. In such an embodiment, the piezoelectric actuator can serve as an actuation unit, a seal, and potentially as a suspension for the touch-screen. Such an embodiment is advantageous because it occupies less space than other conventional designs. Such an embodiment may also provide more intense haptic effects, since the piezoelectric actuator can serve to isolate the touch-sensitive interface, thereby amplifying the haptic effect. In some embodiments, lateral actuation can be implemented without placing the actuator between the display and the touch-screen. In such an embodiment, the spacing between the display and the touch-screen can be reduced, thus leading to a lighter and stronger device.

General Considerations

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such That which is claimed is:

1. An apparatus comprising: a display;
a touch-sensitive interface positioned above the display and comprising an interface surface, the touch-sensitive interface configured to move with respect to the display in a plane lateral to the interface surface; and
a piezoelectric actuator positioned above the display and underneath the touch-sensitive interface, the piezoelectric actuator comprising a first portion mounted to the display and a second portion mounted to the touch-sensitive interface, the piezoelectric actuator configured to receive a haptic signal and output a force in the plane lateral to the interface surface by bending into a curved shape, the force configured to move the touch-sensitive interface between at least two positions in the plane lateral to the interface surface to generate a haptic effect.

2. The apparatus of claim 1, wherein the force is configured to oscillate the touch-sensitive surface between the at least two positions to generate a vibrotactile haptic effect.

3. The apparatus of claim 1, wherein the piezoelectric actuator comprises a monolithic piezoelectric actuator.

4. The apparatus of claim 1, wherein the piezoelectric actuator comprises a composite piezoelectric actuator.

5. The apparatus of claim 1, wherein the display is mounted to a housing.

6. The apparatus of claim 5, wherein the housing comprises a mobile device housing.

7. The apparatus of claim 1, further comprising a processor in communication with the piezoelectric actuator, the processor configured to transmit the haptic signal to the piezoelectric actuator.

8. The apparatus of claim 1, wherein the touch-sensitive interface and the display form a touch-screen display.

9. The apparatus of claim 1, wherein the piezoelectric actuator comprises a seal between the touch-sensitive interface and the display.

10. A method comprising:
receiving an input signal from a touch-sensitive interface positioned above a display, the touch-sensitive interface comprising an interface surface and configured to move with respect to the display in a plane lateral to the interface surface;
determining a haptic effect based at least in part on the input signal; and transmitting a haptic signal corresponding to the haptic effect to a piezoelectric actuator configured to output a force in the plane lateral to the interface surface by bending into a curved shape, the force configured to move the touch-sensitive interface between at least two positions in the plane lateral to the interface surface to generate the haptic effect, wherein the piezoelectric actuator is positioned above the display and underneath the touch-sensitive interface, and the piezoelectric actuator comprises a first portion mounted to the display and a second portion mounted to the touch-sensitive interface.

11. The method of claim 10, wherein the force is configured to oscillate the touch-sensitive surface between the at least two positions to generate a vibrotactile haptic effect.

12. The method of claim 10, wherein the piezoelectric actuator forms a seal between the touch-screen and the display.

13. The method of claim 10, wherein determining the haptic effect comprises determining an intensity of force to output and determining a length of time to output the force, wherein the length of time is based on a duration of an interaction with the touch-sensitive surface.

14. A system comprising: a base;
a display mounted to the base and configured to receive a display signal and in response output an image on a display surface, the display configured to move with respect to the base in a plane lateral to the display surface;
a touch-sensitive interface positioned above the display and configured to transmit sensor signals corresponding to an interaction with the touch-sensitive interface;
a processor configured to receive the sensor signals, determine a haptic effect, and transmit a haptic signal corresponding to the determined haptic effect; and
a piezoelectric actuator mounted underneath the display and above the base, the piezoelectric actuator configured to receive the haptic signal and output a force in the plane lateral to the display surface by bending into a curved shape, the force configured to generate the haptic effect by moving the display between at least two positions in the plane lateral to the display surface, wherein the piezoelectric actuator comprises a first portion mounted to the base by a first clamp and a second portion mounted to the display by a second clamp.

15. The system of claim 14, wherein the piezoelectric actuator forms a seal between the display and the base.

16. The apparatus of claim 1, wherein the piezoelectric actuator is embedded in a polymer matrix.

17. The apparatus of claim 1, wherein the touch-sensitive interface comprises a switch or trackball.

18. The apparatus of claim 1, further comprising a second piezoelectric actuator mounted to an opposite side of the touch-sensitive interface from the piezoelectric actuator, the second piezoelectric actuator configured to receive a second haptic signal and responsively output a second force in the plane lateral to the interface surface, wherein a combination of the force output by the piezoelectric actuator and the second force output by the second piezoelectric actuator is configured to move the touch-sensitive interface between the at least two positions in the plane lateral to the interface surface.

19. The apparatus of claim 1, wherein the piezoelectric actuator is a monolithic strip of piezoelectric material.

20. The apparatus of claim 14, wherein the piezoelectric actuator is mounted between the display and the base using three clamps, the three clamps comprising the first clamp and the second clamp.

* * * * *

UNITED STATES PATENT AND TRADEMARK OFFICE
CERTIFICATE OF CORRECTION

PATENT NO. : 9,870,053 B2  Page 1 of 1
APPLICATION NO. : 12/701880
DATED : January 16, 2018
INVENTOR(S) : Modarres et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 411 days.

Signed and Sealed this
Twenty-fifth Day of September, 2018

Andrei Iancu
*Director of the United States Patent and Trademark Office*